United States Patent [19]

Fadyk

[11] Patent Number: 5,787,948
[45] Date of Patent: Aug. 4, 1998

[54] MACHINE FOR PRODUCING WOOD MOLDING

[75] Inventor: Michael W. Fadyk, Arnprior, Canada

[73] Assignee: 1070276 Ontario Ltd., Arnprior, Canada

[21] Appl. No.: 848,427

[22] Filed: May 8, 1997

[51] Int. Cl.$^6$ .................................................. B27C 1/02
[52] U.S. Cl. ...................... 144/130; 144/117.2; 144/114.1
[58] Field of Search ........................... 144/114.1, 117.1, 144/117.2, 126, 128, 130

[56] References Cited

U.S. PATENT DOCUMENTS

| | | | |
|---|---|---|---|
| 2,630,150 | 3/1953 | Lacelle | 144/130 |
| 2,780,250 | 2/1957 | Leonard | 144/130 |
| 4,436,126 | 3/1984 | Lawson | 144/130 |

*Primary Examiner*—W. Donald Bray
*Attorney, Agent, or Firm*—George A. Seaby

[57] ABSTRACT

A machine for producing wooden molding includes a base, a table floating on said base for supporting a wooden workpiece for travel beneath a cylindrical cutter head, rollers mounted in a frame on the table for moving a workpiece across the table beneath the cutter head, a vertically movable mast mounted on the base, and an arm carrying the cutter head pivotally connected to the mast for rotation around a horizontal axis, whereby the height and inclination of the cutter head relative to the workpiece can readily be changed.

10 Claims, 8 Drawing Sheets

MACHINE FOR PRODUCING WOOD MOLDING

BACKGROUND OF THE INVENTION

1. Field of the Invention

This invention relates to a wood shaping machine, and in particular to a machine for shaping a wooden workpiece to change the cross-sectional profile thereof.

While the machine described herein was constructed mainly to produce curved wooden molding, the machine can be used with equal advantage to produce straight moldings.

2. Discussion of the Prior Art

The first step in the conventional method of producing a shaped wooden workpiece or molding for use around arched windows or as the corner of a bar rail is to form a laminate of thin wooden strips. The strips are bent to the desired final curvature and glued together to form an elongated curved bar having the overall dimensions of the finished product. The bar or wooden workpiece thus produced is then passed beneath a cutter head carrying blades for imparting the desired profile to the workpiece. However, when producing a relatively thick molding or a curved molding of the type described above, it is usually necessary to make several passes through a shaping machine. The multiple pass method is necessary especially when there is considerable variation in the thickness of the finished product across its width. With existing machines, the angle of the cutter head with respect to the table is fixed. When cutting such moldings, the cutter head of the machine is placed in one setting and a wooden workpiece is fed along a work table beneath the cutter head to make a first cut. The cutter head is replace with another head, or the blades of the head are replaced with different blades and a second cut is made. It is often necessary to repeat the process three or more times to produce the desired profile. Obviously, the production of molding in this manner is labour intensive and time consuming.

GENERAL DESCRIPTION OF THE INVENTION

The object of the present invention is to provide a solution to the problem described above in the form of a relatively simple wood shaping machine, which can be used to produce markedly profiled moldings in a single pass, i.e. by passing a wooden workpiece through the machine once only.

Accordingly, the present invention relates to a machine for shaping a wooden workpiece comprising a base; a table mounted on said base for slidably supporting a workpiece; a guide on said table for guiding said workpiece during passage over said table; an arm carried by and rotatable around a horizontal axis with respect to said base, said arm having a top end located above said table; a cylindrical cutter head on the top end of said arm for rotation around an axis above said table perpendicular to a workpiece for engaging the workpiece during passage along the table; a first drive mounted on said arm beneath said cutter head for driving said cutter head; and a tilt assembly for tilting said arm and consequently said cutter head to shape the angle of the cutter head with respect to a workpiece on the table.

BRIEF DESCRIPTION OF THE DRAWINGS

The invention is described below in greater detail with reference to the accompanying drawings, which illustrate a preferred embodiment of the invention, and wherein.

DESCRIPTION OF THE PREFERRED EMBODIMENT

Figure 1:
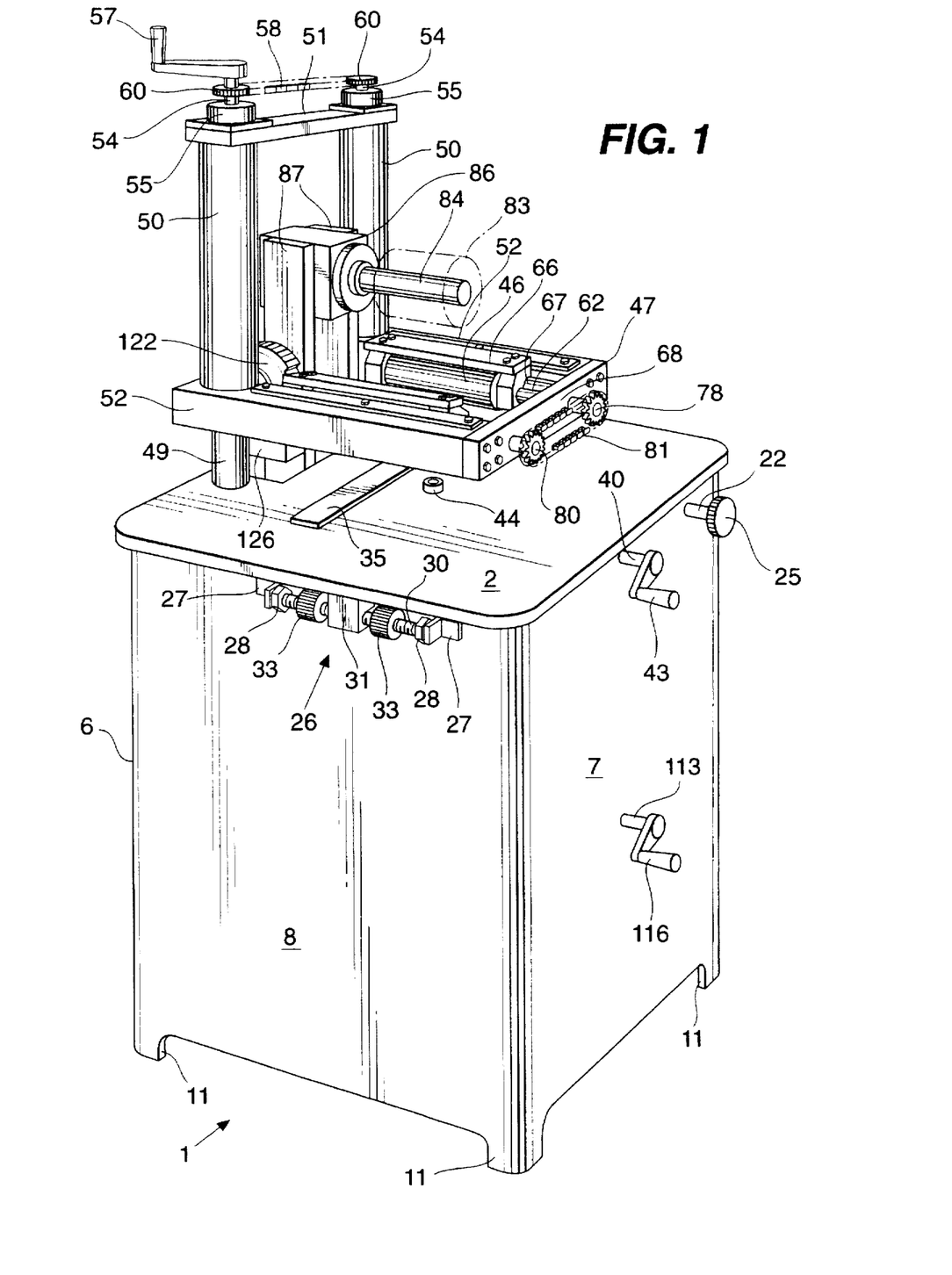
FIG. 1 is an isometric view of a wood shaping machine in accordance with the present invention.
Figure 2:
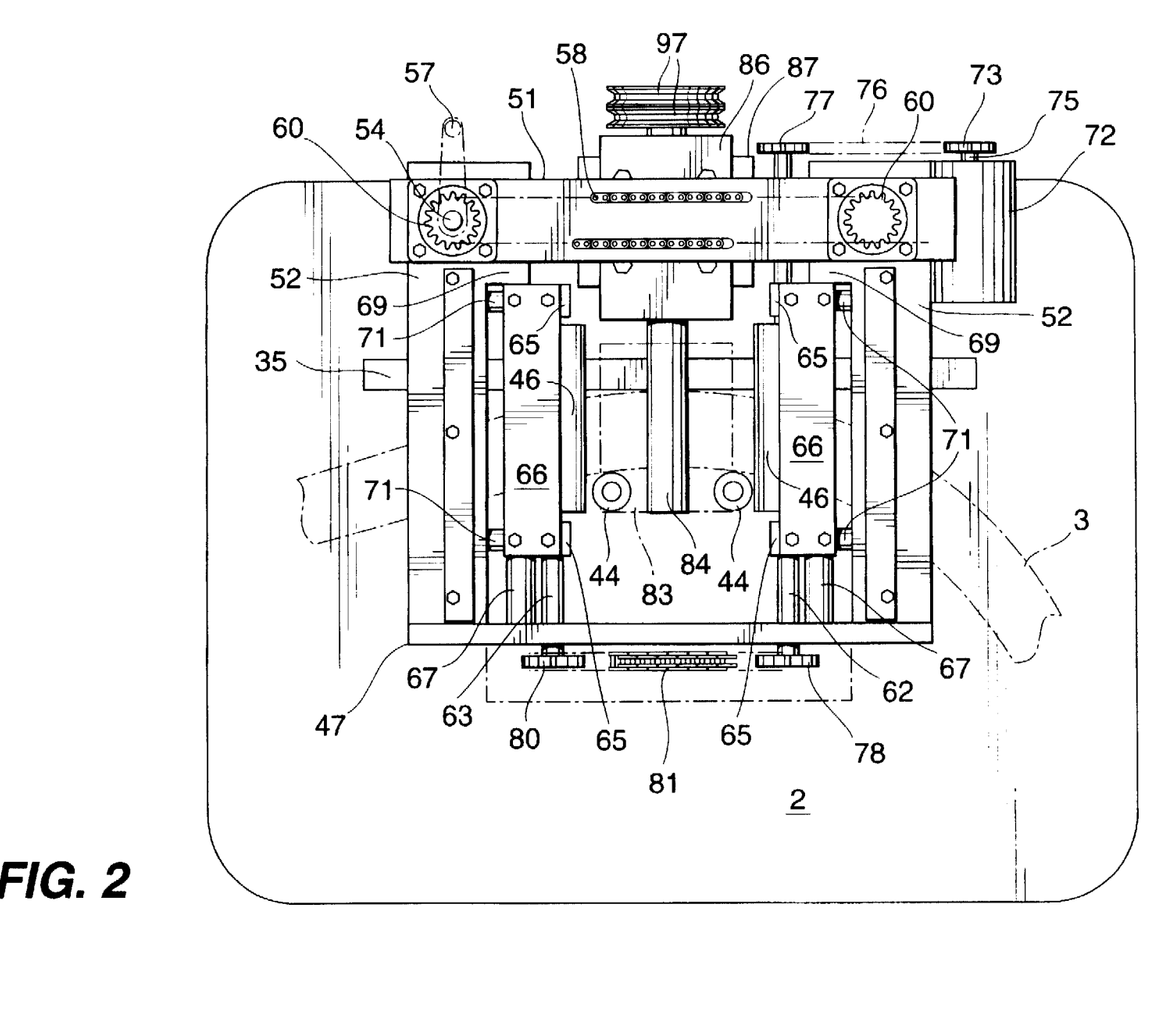
FIG. 2 is a top view of the machine of FIG. 1.

Referring to FIGS. 1 to 4, a wood shaping machine in accordance with the present invention includes a frame or base generally indicated at 1 carrying a table 2 for receiving a wooden workpiece 3 (FIG. 2). The base 1 is defined by a one-piece hollow, rectangular, sheet metal housing 6 which includes a front wall 7, side walls 8 and rear flanges 9 (FIG. 3) extending inwardly from the back edges of the side 8. Feet 11 are provided at the corners of the base 1. The rectangular table 2 floats above the top of the base 1. For such purpose, ledges 12 extend along the interior of the side walls 8 between the front wall 7 and the rear flanges 9. The ledges 12 support brackets 14 at each end thereof, which carry a pair of parallel, spaced apart shafts 15. Generally T-shaped blocks 16 are slidably mounted on the shafts using linear bearings 17. The table 2 is connected to the four blocks 16 so that the table is uniformly supported near the corners thereof. Thus, the table 2 is free to move forwardly and rearwardly but not transversely on the base 1.

While the table 2 floats above the base 1, it is not freely floating. The freedom of the table 2 is limited by a structure including a block 19 connected to the bottom of the table 2. A second block 21 is mounted on a rod 22 in spaced apart relationship to the block 19. The rod 22 is threaded into the block 21 and a helical spring 24 is mounted on the rod 22 between the blocks 19 and 21. The rod 22 extends outwardly through the front wall 7 of the base 1. Because the block 21 is immediately beneath the table 2, it can not rotate with the rod 22. By turning a knob 25 on the outer end of the rod 22 the distance between the blocks 19 and 21, the tension on the spring 24 and consequently the freedom of movement of the table 2 is changed.

Figures 5, 6:
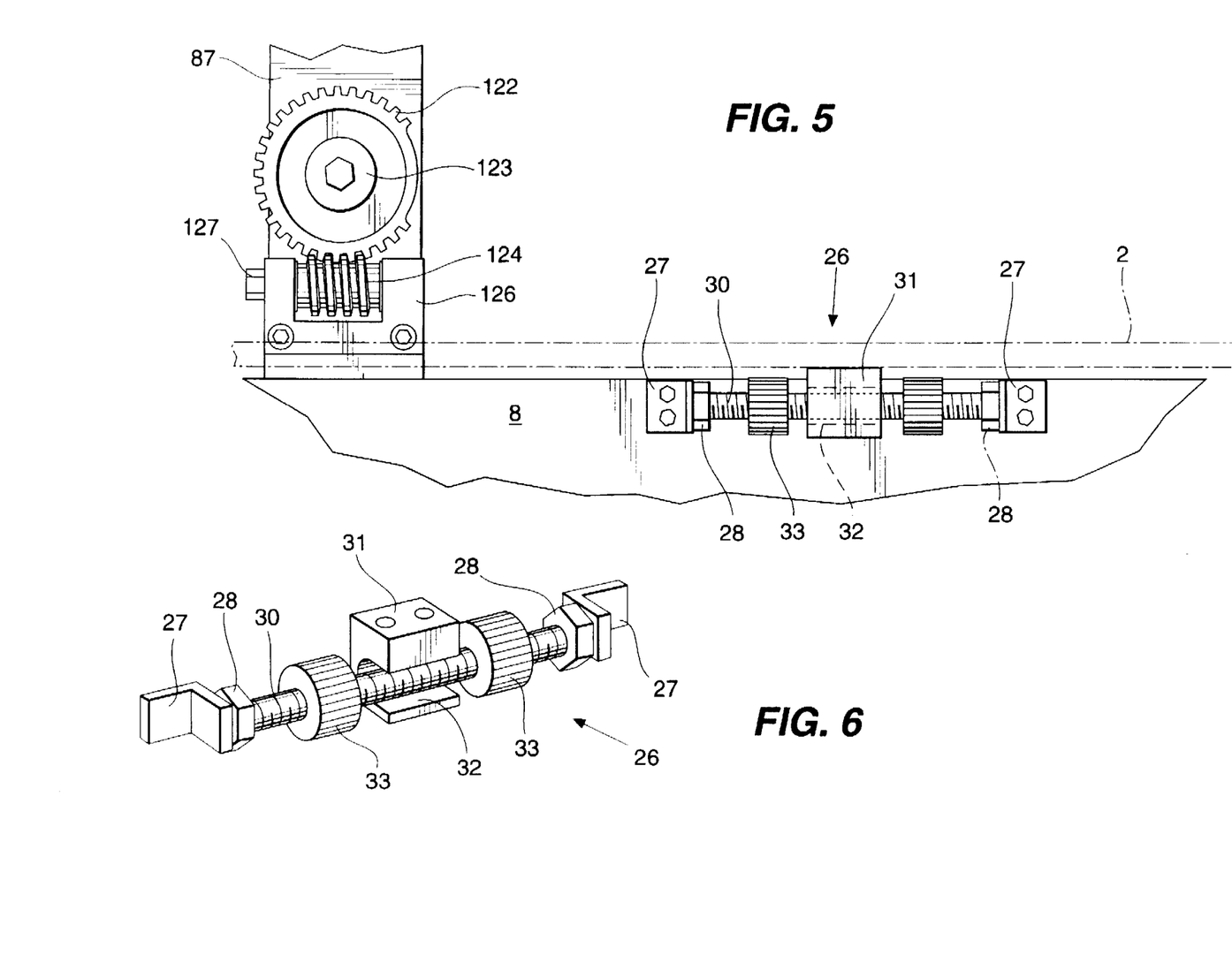
FIG. 5 is a side view of a table stop and an arm tilting mechanism used in the apparatus of FIGS. 1 and 2.
FIG. 6 is a perspective view of the table stop of FIG. 5.

The limits of movement of the table 2 in the forward and backward directions is restricted by a stop generally indicated at 26 (FIGS. 1, 3 and 4 to 6). As best shown in FIGS. 5 and 6, the stop 26 includes a pair of generally L-shaped brackets 27 mounted on one side wall 8 of the base 1 immediately below the table 2. A nut 28 welded to each bracket 27 supports the ends of a threaded rod 30 extending between the two brackets. A slide in the form of a block 31 with a longitudinally extending, concave groove 32 (FIG. 6) in the outer side thereof is slidably mounted on the rod 30 and connected to one edge of the table 2 for movement therewith. Movement of the slide and consequently of the table 2 is limited by a pair of knurled nuts 33 mounted on the rod 30 on either side of the block 31.

Figure 3:
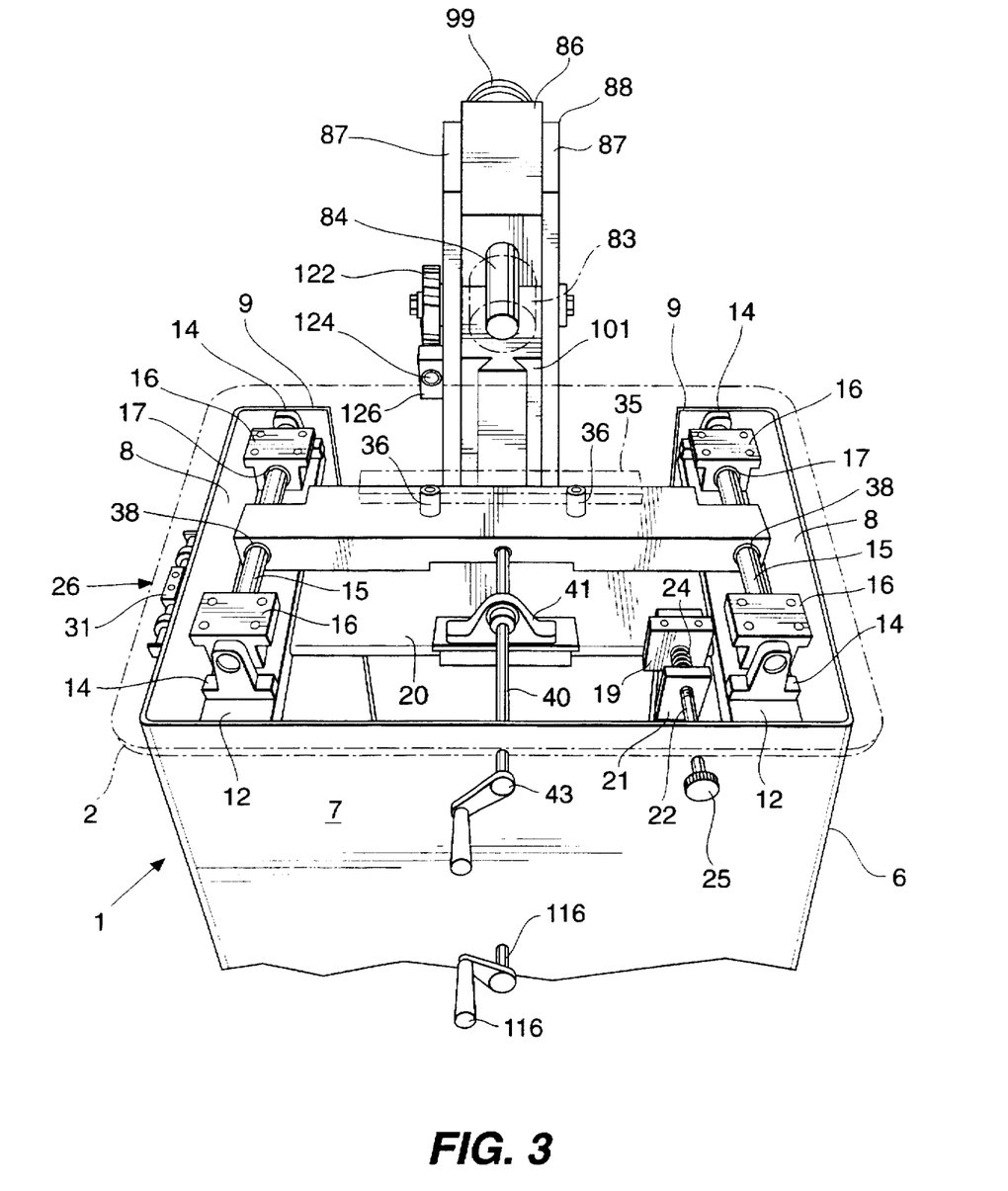
FIG. 3 is a perspective view of the machine of FIG. 1 with parts removed.
Figure 4:
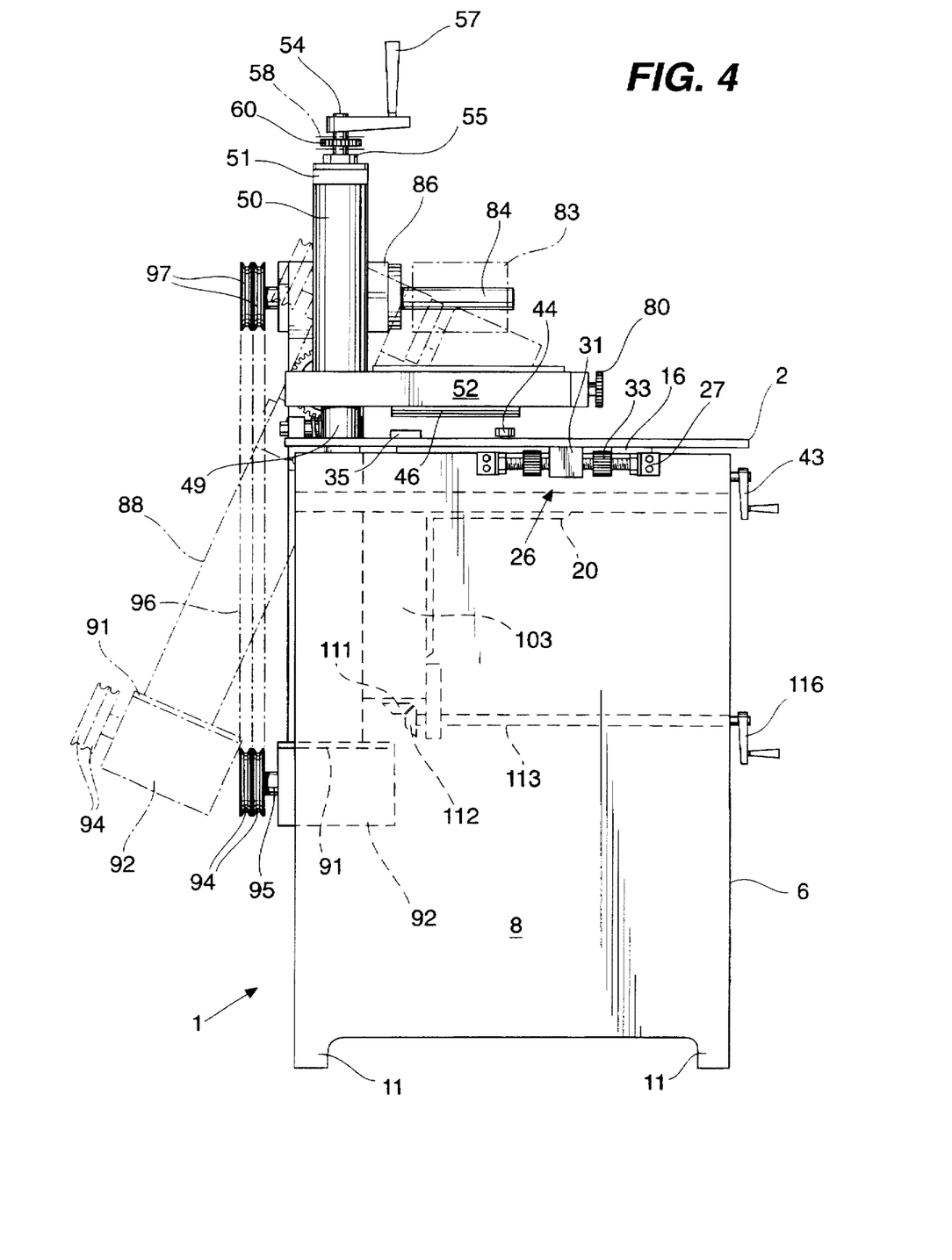
FIG. 4 is a side view of the machine of FIGS. 1 and 2.

A wooden workpiece 3 (FIG. 2) is guided across the table 2 by a fence 35 in the form of a bar mounted near the rear end of the table. As best shown in FIG. 3, the fence 35 is mounted on posts 36 extending through short slots (not shown) in the table 2. The posts 36 extend upwardly from a slide 37 extending between and slidable on the shafts 15. For such purpose bushings 38 are provided in holes extending through the slide 37. The location of the fence 35 is adjusted by means of a rod 40 with an threaded end, which engages threads (not shown) in the center of the slide 37. The rod 40 extends outwardly through a pillow block bearing 41 on the crossbar 20 and the front wall 7 of the base 1. A handle 43 is provided on the outer end of the rod 40 for rotating the latter. Movement of the fences results in corresponding longitudinal movement of the table top 2 on the base 1. The fence 35 is opposed by a pair of spaced apart, cylindrical rollers 44 mounted on the table top.

As is readily apparent from FIG. 2, if a straight workpiece 3 of constant width throughout its length is passed between the fence 35 and the rollers 44, no relative movement between the fence and rollers is required. However, when shaping a curved workpiece 3, at curved areas the effective width of the workpiece 3 changes as the workpiece advances across the table. Thus, it is necessary to change the spacing between the fence 35 and the rollers 44. Tension on the workpiece 3 is maintained by the tension device 18, i.e., the tension device 18 limits movement of the table 2 and consequently of the rollers 44 relative to the fence 35 to maintain pressure on the workpiece 3.

The workpiece 3 is maintained on and fed across the table 2 by a pair of spaced apart, cylindrical pressure rollers 46 bordering a work area. The rollers 46 are mounted in a generally rectangular frame 47, which is slidably mounted for vertical movement on a pair of tubular posts 49 extending upwardly from the rear end of the table 2. The posts 49 carry a pair of sleeves 50, the top ends of which are interconnected by a crossbar 51. The sides 52 (FIGS. 1, 2 and 4) of the frame 47 are connected to the bottom ends of the sleeves 50 for movement therewith. Movement of the sleeves 50 and consequently of the frame 47 is effected by means of shafts 54 extending through bearings 55 on the crossbar 51. All but the top ends of the shafts 54 are threaded for engaging internally threaded inserts 56 in the top ends of the posts 49. The insert 56 is press fitted into the top end of the post 49.

Rotation of the shafts 54 is effected by a handle 57 on the top end of one of the shafts 54. A chain 58 extends around toothed wheels or sprockets 60 on the top ends of the shafts 54 for causing the shafts to rotate in unison. Rotation of the handle 57 causes the sleeves 50 and consequently the frame 47 to move vertically on the posts 49.

The rollers 46 are mounted on shafts 62 and 63 which are rotatably mounted in brackets, each of which is defined by a pair of blocks 65 interconnected by a top plate 66. The blocks 65 are rotatably mounted on a shaft 67 extending between a bar 68 defining the front end of the frame 47 and arm 69 on the rear end of the sides 53 of the frame 47. One end of a pair of pins 71 mounted in recesses (not shown) in the sides 53 of the frame 47 bear against the top of the blocks 65. Helical springs (not shown) held in the recesses by the pins 71 bias the pins against the top ends of the blocks 68. Thus, the rollers 46 are pressed downwardly into firm engagement with the wooden workpiece 3.

The rollers 40 are driven by a motor 72 mounted on the rear end of one side 53 of the frame 47. A sprocket 73 on the motor shaft 75 is connected by a chain 76 to a sprocket 77 on the rear end of the shaft 62. The shaft 62 extends forwardly through the blocks 65, one roller 46 and the bar 68 defining the front end of the frame 47. A sprocket 78 on the front end of the shaft 62 is connected to a sprocket 80 on the front end of the other shaft 63 by an endless chain 81 for driving the shafts in unison. The shaft 63 extends through the front end of the frame 47, the front block 65 and the roller 46 into the rear block 65.

Actual wood shaping is effected by a tool defined by a conventional cylindrical cutter head 83 of the type including blades (not shown) extending tangentially from the cutter head. The cutter head 83 is mounted on a shaft 84 extending forwardly from a block 86 mounted between the top ends of the sides 87 of a hollow arm 88. The arm 88 is defined by a pair of rectangular plates forming the sides 87, rear crossbars 90 extending between the sides 87 and a bottom plate 91 carrying a motor 92 which drives the cutter head 83. For such purpose, pulleys 94 mounted on the shaft 95 of the motor are connected by V-belts 96 (FIGS. 4 and 5) to pulleys 97 on the shaft 84 carrying the cutter head 83.

The arm 88 is pivotally mounted on the top end of a mast 101, which is slidably mounted for vertical movement on a block 103 connected to the crossbar 20 by bolts 104 (FIGS. 3, 4, 7 and 8). Thus, while the arm 88 can pivot with respect to the mast 101 and the table 2, the mast 101 is slidable in a vertical position to change the vertical location of the cutter head 83 with respect to the table 2.

Figure 7:
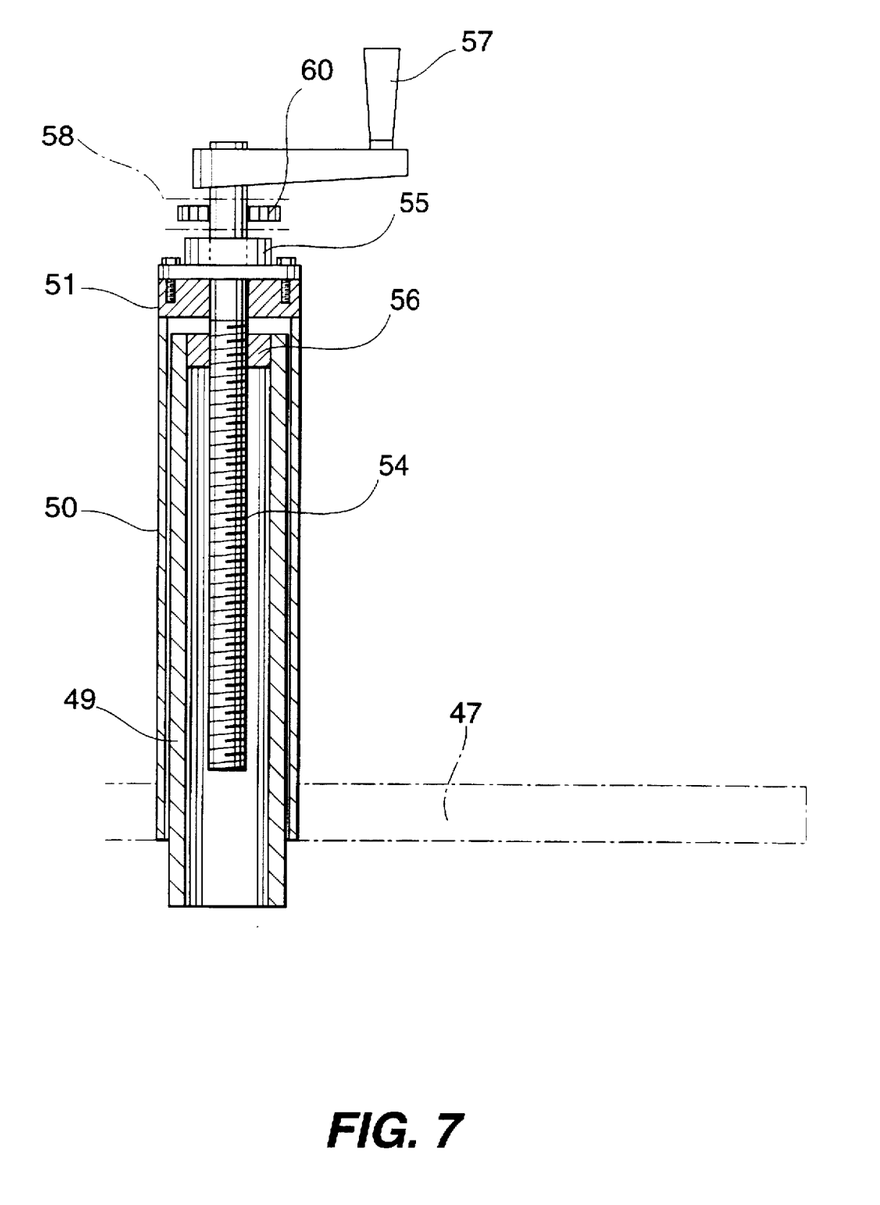
FIG. 7 is a longitudinal sectional view of a post and frame assembly used in the machine of FIGS. 1 to 4.
Figure 8:
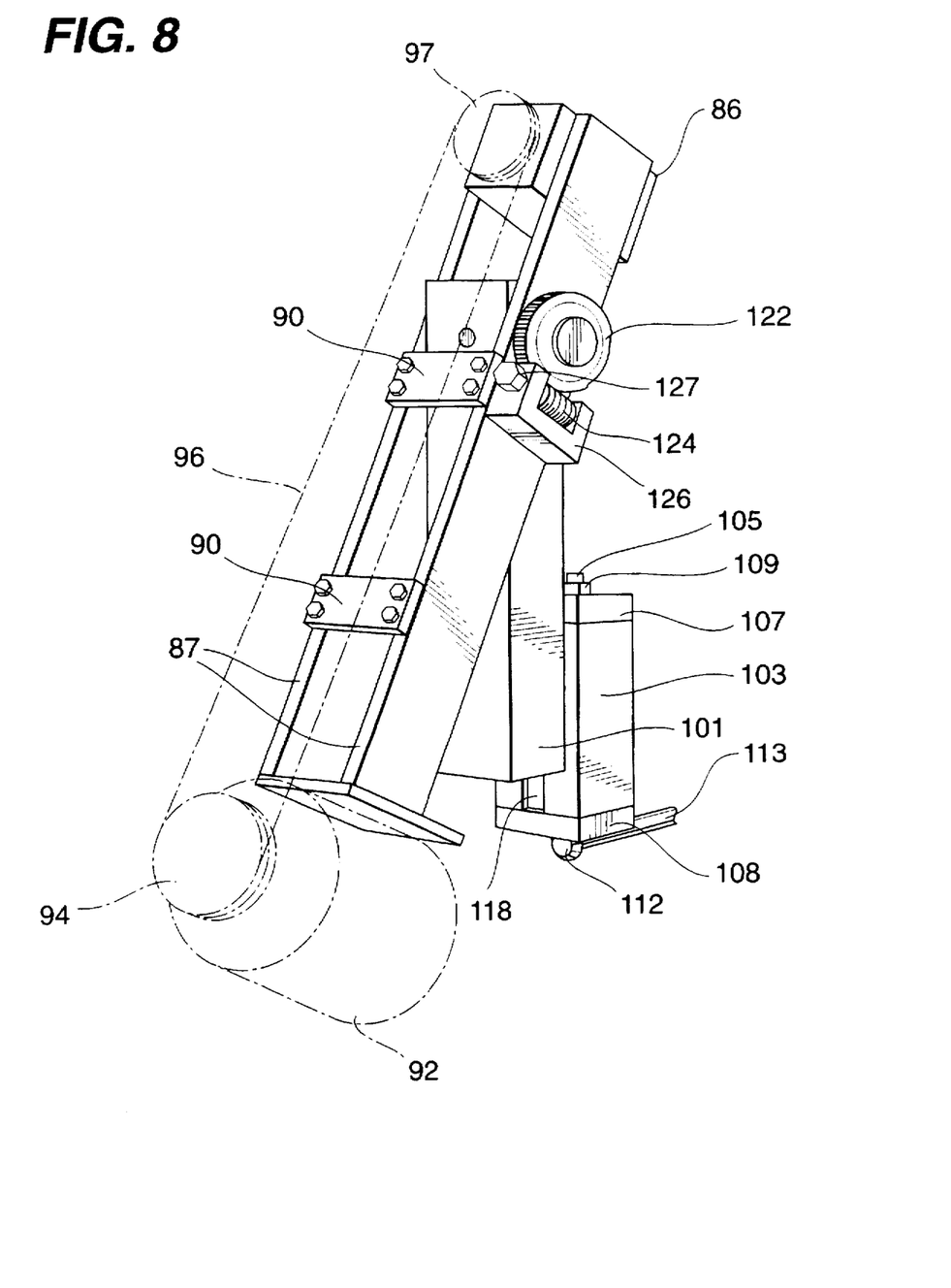
FIG. 8 is a perspective view from the rear and one side of an arm and drive assembly used in the machine of FIGS. 1 to 4.
Figure 9:
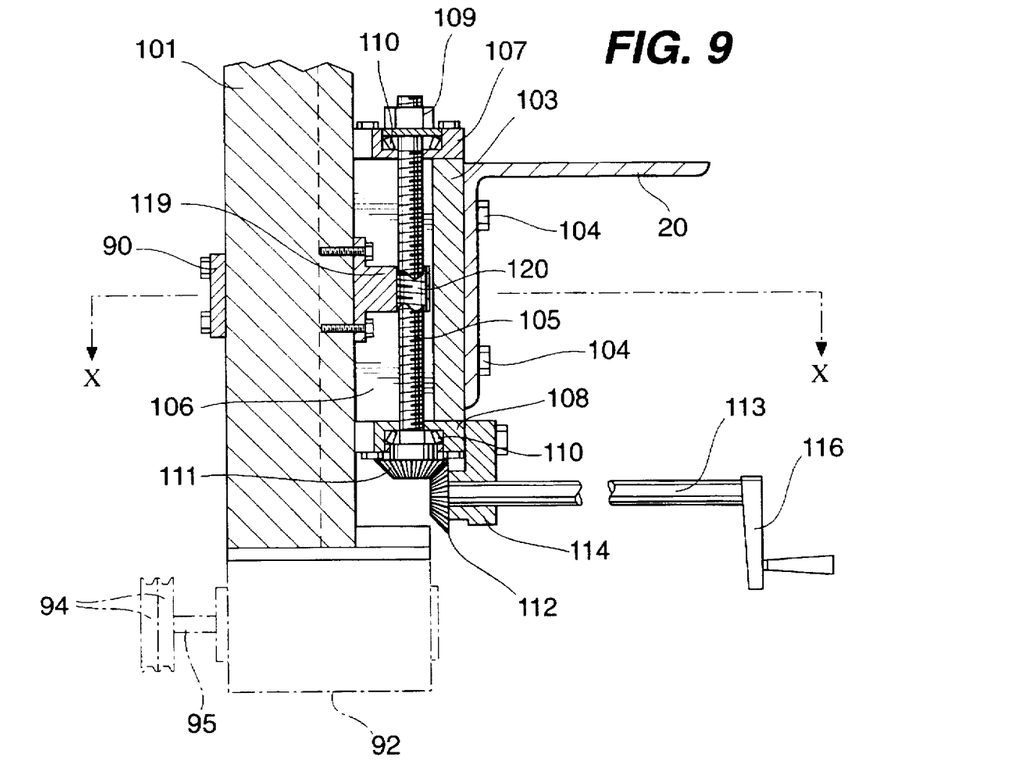
FIG. 9 is a longitudinal sectional view of a device for raising and lowering a mast and cutter head used in the machine of FIGS. 1 and 2.
Figure 10:
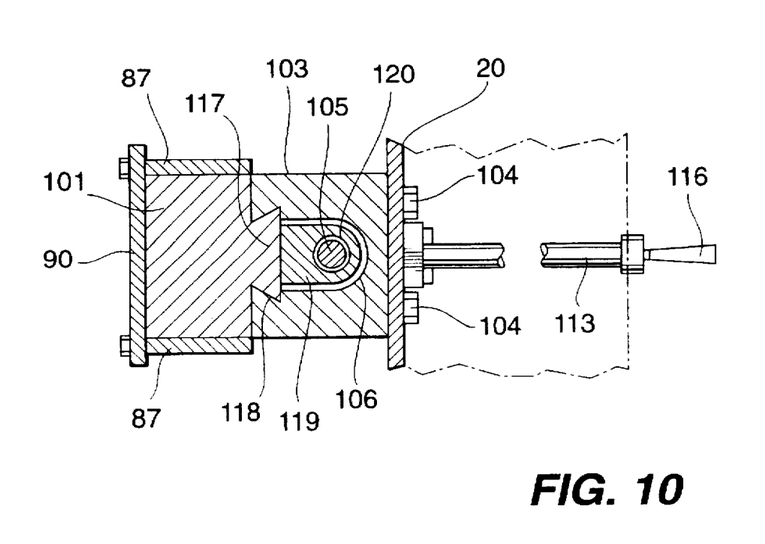
FIG. 10 is a cross section taken generally along line X—X of FIG. 8.

As best shown in FIGS. 3, 7 and 8, the mast 101 is moved vertically by a screw 105 mounted in the block 103. The screw 105 extends vertically through a U-shaped, longitudinally extending recess 106 in the block 103 between top and bottom plates 107 and 108, respectively. A nut 109 connects the top end of the screw 105 to the top plate 107. Bearings 110 are provided in the plates 107 and 108 permitting rotation of the screw 104 in the recess 106. A bevel gear 111 mounted on the bottom end of the screw 104 meshes with a second bevel gear 112 mounted on the inner end of a shaft 113. The shaft 113 is rotatably mounted in an L-shaped bracket 114 extending downwardly from the plate 108. The shaft 113 extends outwardly through the front wall 7 of the base 1, and a handle 116 is attached to the outer end thereof. Rotation of the handle 116 results in a corresponding rotation of the shaft 113 and rotation of the screw 104 in the block 103.

The mast 101 is slidably connected to the block 103 by a dovetailtype joint defined by a flaring spline 117 on the mast 101 and an outwardly tapering recess 118 extending the length of the block 103. A generally U-shaped hub 119 connected to the mast 101 extends into the recess 106 in the block 103. The screw 105 engages threads in a passage 120 through the hub 119. By rotating the screw 105, the mast 101 is caused to move vertically with respect to the block 103.

Tilting of the arm 88 on the mast 101 is effected by a worm wheel assembly including a worm wheel 122 mounted on a shaft 123 extending through the sides 87 of the arm 88 and the top end of the mast 101, and a worm or screw 124 mounted in a bracket 126 on one side 87 of the arm 88. The shaft 123 is rotatable in the mast 101, but the sides 87 of the arm 88 are fixed to the shaft. The worm wheel 122 is connected to one end of the shaft 123 for rotation therewith, and to one side 87 of the arm 88. Thus, when the hexagonal head 127 of the screw 124 is rotated, the screw travels around the wheel 122 to pivot the arm 88 around the longitudinal axis of the shaft 123, whereby the angle of the cutter head with respect to the workpiece 3 is changed. With such an arrangement, i.e. by adjusting the vertical gap between the cutter head 83 and the table 2 and the angle of the cutter head with respect to the workpiece 3, a molding with a steep slope from side to side can be cut in a single pass of the workpiece 3 beneath the cutter head 83. Moreover, by using the machine described above, it is possible to cut all the way down to the top of the table which has not been possible.

I claim:

1. A machine for shaping a wooden workpiece comprising a base; a table mounted on said base for slidably supporting a workpiece; a guide on said table for guiding said workpiece during passage over said table, an arm carried by and rotatable around a horizontal axis with respect to said base, said arm having a top end located above said table; a cylindrical cutter head on the top end of said arm for rotation around an axis above said table perpendicular to a workpiece for engaging the workpiece during passage along the table, a first drive mounted on said arm beneath said cutter head for driving said cutter head; and a tilt assembly for tilting said arm and consequently said cutter head to shape the angle of the cutter head with respect to a workpiece on the table.

2. The shaping machine of claim 1, including a mast supporting said arm for vertical movement on said base whereby the vertical position of said cutter head relative to the workpiece and table can be changed.

3. The shaping machine of claim 2, including a frame on said table slidably mounted for vertical movement above said table; at least one pressure roller carried by said frame for engaging a wooden workpiece to maintain the workpiece flat on the table; and a second drive for rotating said pressure roller to cause the workpiece to move along the table beneath said cutter head.

4. The shaping machine of claim 1, including a carriage assembly for supporting said table above said base, whereby the table is free to move in a direction perpendicular to the workpiece during passage of the workpiece along the table top.

5. The shaping machine of claim 4, including stop means on said base engaging said table for limiting movement of said table top relative to said base between predetermined limits.

6. The shaping machine of claim 5, including a spring between said base and said table for dampening movement of said table with respect to the base.

7. The shaping machine of claim 6, wherein said guide includes a fence on said table for engaging one side of a workpiece to guide the workpiece during movement across said table, and at least one guide roller spaced apart from said fence on said table for engaging the other side of the workpiece during movement across the table.

8. The shaping machine of claim 4, wherein said carriage assembly includes shafts on said base extending perpendicular to the direction of travel of a workpiece across said table, and blocks connected to said table and slidably mounted on said shafts, permitting movement of the table perpendicular to the direction of travel of the workpiece.

9. The shaping machine of claim 2, including a pair of posts extending upwardly from said table; a frame slidably mounted on said posts for vertical movement relative to said table; a pair of spaced apart pressure rollers carried by said frame for engaging a workpiece to maintain the workpiece flat on the table; and a second drive for rotating said pressure rollers to cause the workpiece to move beneath said cutter head.

10. The shaping machine of claim 9, including brackets in said frame carrying said rollers, and springs biasing said brackets and consequently said rollers into a workpiece engaging position.

* * * * *